April 16, 1929.　　C. A. WANGERIN　　1,709,640

LAWN TRIMMER

Filed Nov. 6, 1925

Patented Apr. 16, 1929.

1,709,640

UNITED STATES PATENT OFFICE.

CHARLES A. WANGERIN, OF MILWAUKEE, WISCONSIN.

LAWN TRIMMER.

Application filed November 6, 1925. Serial No. 67,270.

This invention relates to a lawn trimmer.

Objects of this invention are to provide a lawn trimmer which is propelled by means of a handle and is provided with means adjacent the end of the handle for operating the lawn trimmer, and which is so constructed that it may be readily and easily guided along the edge of a lawn, for instance, or in relatively difficultly accessible positions to supplement or complete the action of the ordinary lawn mower.

It is well known that in mowing a lawn difficulty is experienced with the ordinary type of lawn mower in cutting the grass around the edges of the lawn adjacent the side walks, around flowers or trees or trees and other similar places.

This invention is designed to provide a machine for trimming relatively inaccessible portions of the lawn which are ordinarily missed or avoided in the use of the usual lawn mower.

Further objects are to provide a lawn trimmer which is of extremely simple and reliable construction, and in which means are provided for yieldingly pressing the cutting blades towards each other, so as to maintain the correct amount of pressure between the blades.
An embodiment of the invention is shown in the accompanying drawings, in which:—

Figure 1 is a side elevation partly in section of the trimmer.

Figure 2 is a plan view of the structure shown in Figure 1 with parts broken away.

Referring to the drawings, it will be seen that the trimmer comprises a body portion 1 for accommodating all the active elements is preferably a unitary casting provided with a forward under lip 2 offering a transverse rest, and an upwardly extending back portion 3. Preferably this back portion continues around the edges of the machine, as indicated generally in dotted lines in Figure 2. The body portion extends rearwardly and is provided with an inclined socket 4 which receives a removable handle 5. Further, the body portion is provided with an integral pair of spaced lugs 6 between which a single roller 7 is rotatably mounted and a similar lug for accommodating the bell crank 21—22. The roller 7 provides a tractionable foot which forms the apex of a triangular ground rest whose base is the front edge of 2; the said foot and the said edge relationship, determining the fixed cutting gauge for the shearing elements.

The body portion is hollow, as indicated at 8, to provide an elongated compartment or channel. This compartment is closed by means of a top plate 9 secured by means of screws 10 to the back portion 3, as shown in the drawings. This plate extends at its forward edge downwardly into proximity to the upwardly extending portion of the bottom lip 2. This portion of the bottom lip has rigidly secured thereto the fixed cutter blade 11, such blade being attached by screws or in any suitable manner. A movable blade 12 is provided and contacts with the stationary blade. It is equipped with a downwardly extending rear flange 13 which slides inside of the rear of the stationary blade 11. It may also contact, if desired, with the upwardly extending part of the bottom lip 2 of the body portion, as shown in Figure 1. The stationary and movable blades are provided with teeth in the usual manner so that relative motion of the blade results in shearing or clipping the grass.

The means for operating the movable blade comprises a lug 14 integral with the movable blade and positioned within the cavity 8. This lug rigidly carries an upwardly extending pin 15 which projects through a slot 16 in the top plate 9. This pin is received in the slot 17 of one arm 18 of the bell crank lever illustrated particularly in Figure 2. This bell crank lever is pivoted to the body portion and has its other arm 19 connected by means of a ball and socket jointed pitman 20 with the arm 21 of a second bell crank lever. This second bell crank lever has an arm 22 which has a ball and socket joint with a rearwardly and upwardly extending pitman or link 23 which projects rearwardly adjacent the handle. The connection 23 is detachable from its actuating bell crank, and may be an element of flexible qualities, such as, chain or the like. The ball and socket connections offer universal joints that permit movements occurring as oscillations, arcuately produced in planes disposed at right angle to each other, to agree with a reciprocating action manually imparted to the element 23.

The handle is provided with a rockable and lever-like flap or grip 24 equipped with ears 25 pivoted to the handle. This grip or flap is also provided with a projecting apertured lug 26 to which the element 23 is connected at 27.

In operating this device, it is rolled along the edge of the lawn or wherever the careful finishing trimming is desired. While it is being slowly propelled along the edge of the lawn the flap or grip 24 is alternately drawn inwardly towards the handle 5 and released. This requires the use of but one hand of the operator as he may, in an obvious manner, readily grip the handle 5 and grip the flap 24. The motion of the flap is communicated to the movable blade 12 by the mechanism described, and causes such blade to reciprocate back and forth across the stationary blade. It is to be noted that the retracting motion of the blade 12 is secured by means of a spring 28 fastened to the plate 9 at one end and to the arm 18 of the first described bell crank lever.

In order to insure the correct pressure between the blades, a novel means is provided consisting of two or more springs 29 seated in sockets in the downwardly extending portion of the cover 9, as shown particularly in Figure 1. Each socket also carries a ball 30 against which the spring bears, thus forcing the ball against the movable blade 12. This construction yieldingly holds the movable blade in contact with the stationary blade, and insures the correct pressure between the blades. Further, the ball bearing minimizes frictional losses.

It will be seen that a novel form of lawn trimmer has been provided which is extremely simple in construction, which is easy to operate and which may trim any difficultly accessible portion of the lawn with comparative ease.

Although the invention has been described in considerable detail, it is to be understood that the invention may be variously embodied and is, therefore, to be limited only as claimed.

I claim:

1. A lawn trimmer having an operative steering handle, a hollow base casting supporting said handle; cutting shears projecting from said base; connecting means, integral with a movable element of the said shears, reciprocative within the hollow base; spring returned leverage means, exteriorly pivoted to said base, attached to said connecting means; a bell-crank oscillatable in a plane at right angle to the said leverage means; and a link element completing a spring opposed assembly for allowing a singular gripping force at the aforesaid handle to oppose the spring returned leverage means.

2. In a lawn trimmer the combination of a dual operative and steering means adapted for singular gripping, a body casting provided with a centrally disposed rearward roller, reciprocating cutting means across the front and above the base of said casting, triangular 3-point ground bearing means provided by said casting and said roller, said means fixing and maintaining a minimum clipping gauge for the aforesaid cutting means, a singular handle element terminating in the dual operative and steering means, leverage connecting elements uniting the remotely located steering means with the cutting means, and a balancing weight formed by the body casting assembly for influencing the said handle to assume its operative position.

In testimony that I claim the foregoing I have hereunto set my hand at Milwaukee, in the county of Milwaukee and State of Wisconsin.

CHARLES A. WANGERIN.